April 9, 1968   R. R. CHAMBERLIN ET AL   3,377,200
PROCESS FOR ACTIVATING PHOTOCONDUCTIVE FILMS
Filed July 31, 1964

INVENTORS
RHODES R. CHAMBERLIN
JOHN S. SKARMAN

BY

THEIR ATTORNEYS

United States Patent Office 3,377,200
Patented Apr. 9, 1968

3,377,200
PROCESS FOR ACTIVATING PHOTO-
CONDUCTIVE FILMS
Rhodes R. Chamberlin, Dayton, and John S. Skarman, West Carrollton, Ohio, assignors to The National Cash Register Company, Dayton, Ohio, a corporation of Maryland
Filed July 31, 1964, Ser. No. 386,606
9 Claims. (Cl. 117—201)

ABSTRACT OF THE DISCLOSURE

The present invention relates to the further doping of a previously formed crystalline photoconductive semiconductive film by sintering an activating powder to a cover, covering the previously formed crystalline photoconductive semiconductive film with the cover, the sintered activating powder layer facing the crystalline photoconductive semiconductive film, and heating the combination to a temperature between 566 degrees centigrade and 621 degrees centigrade for a time ranging from six to twenty minutes. In this manner, the light resistance of the previously formed crystalline photoconductive semiconductive film can be decreased by a factor of at least ten.

---

The present invention relates to a method for increasing the light-to-dark resistance ratio of photoconductive films. More particularly, the invention relates to a method for improving the crystalline and electronic properties of photoconductive as well as luminescent films, particularly Class II–VI films, comprising the novel heat-treatment of such films while the latter are held in contact with vapor emanating from "activating powder" coated on the inner walls of a heat-resistant enclosure for said films.

Although the instant process is particularly useful for increasing light-to-dark resistance ratio in photoconductive films and is well adapted for providing low-light-resistance films, it is also adapted for improving or modifying luminescent film characteristics, particularly Class II–VI luminescent materials, inasmuch as the process, in general, provides a very economical and efficient method for controlled doping of thin semiconductor films.

However, the description of the novel process of the invention will essentially be limited herein to its application in enhancing photoconductive film properties, such as the light-to-dark resistance ratio of films wherein the host crystals belong to the broad class comprising CdS, CdSe, ZnS, CdSSe, etc., which are generally known in the art as Class II–VI films.

Photoconductive films (as well as many luminescent films) of the type mentioned above and susceptible to improvement by the novel heat-treatment process of the invention are generally made by prior-art vapor-reaction and vacuum-evaporation processes, such as, respectively, the process disclosed in United States Letters Patent No. 2,675,331, issued to Dominic A. Cusano and Frank J. Studer on Apr. 13, 1954, and a process of the general nature disclosed by C. Feldman and M. O'Hara, Formation of Luminescent Films by Evaporation, J. Opt. Soc. Am. 47, 300 (1957).

A process of great utility and efficiency for making films of the type adapted for modification and improvement by the present invention is disclosed and claimed in co-pending United States patent application Ser. No. 135,036, filed by James E. Hill and Rhodes R. Chamberlin on Aug. 30, 1961, now United States Patent No. 3,148,084, issued Sept. 8, 1964. The process defined in that application provides a particularly fast, efficient, and economical method for making semiconductive and, more particularly, photoconductive thin films, comprising spraying onto a heated substrate a solution of selected film-forming compounds.

Although films produced by any of the above or similar processes are photoconductive, it is generally known in the art that the light-to-dark resistance ratio of such photoconductive films can be increased by post-heat-treatment at high temperatures.

It is also known that an even greater increase in light-to-dark resistance ratio may be obtained if the photoconductive films are heat-treated (fired) at high temperatures when the films are overcoated with a "covering powder" composed of suitably-doped host crystals; for example, CdS, or CdSe powders doped with Cu and/or Cl. Films heat-treated in such manner are said to be activated with a "covering powder."

In practicing such prior-art processes of activation by the use of "covering powder," it is customary to dust a suitably-doped powder in a heavy layer over a previously deposited Class II–VI film and then fire the covered film at about 1,000 degrees centigrade for about fifteen minutes.

One major disadvantage of using a thick layer of "covering powder" over a photoconductive film is the uneconomical utilization of such powder; after each firing, the large excess of "covering powder" must be removed from the film surface. Even though the removed "covering powder" is not exhausted as a doping agent, in actual practice it is never reused. Thus, the process is wasteful in the use of "covering powder."

Another disadvantage of the conventional "covering powder" method is the tendency of the powder to adhere to the surface of the photoconductive film. Powder adherence not only detracts from the smooth appearance of the film but generally reduces the efficient utilization of incident light.

The novel process of the present invention eliminates the above-mentioned and other disadvantages inherent in such prior-art processes by providing a process in which the "activating powder" is sintered on the inside of a ceramic boat or cover, usually a five-sided cover, instead of directly onto the film to be activated. For the purposes of this invention, "activating powders," to be used hereinafter, refers to the same type of powders commonly known in the art as "covering powders." The former is preferred, since it evades the connotation that the powder directly covers the film to be activated. In use, the boat or cover is placed over a number of substrates which have been pre-coated with selected photoconductive films. The pre-coated substrates may be placed directly onto a heating plate or element or, preferably, are held in shaped recesses in a ceramic substrate holder, which is placed on a heating element or oven floor. The cover, the inside lid of which is coated with "activating powder," has such configuration that, when it is in position over the pre-coated substrates, the "activating powder" is preferably positioned less than one half-inch but more than one eighth-inch above the films coated on said substrates. In effect, when the cover is placed over the pre-coated substrates, it provides an enclosure within which vapors emanating from the coated "activating powder" are trapped when the combination is heated to activating temperatures of about 593.3 degrees centigrade. The sides of the cover or boat are sufficiently well seated on the floor of the furnace or on the heating element to essentially prevent leakage of the vapor produced during the firing.

A major advantage of the invention is that many activations may be made with the same "activating powder" on the cover. With slight variation for the different films, as many as fifteen to twenty activations have been accomplished with the same "activating powder."

It has been found that the light-to-dark resistance ratio is generally increased by a factor of about "ten" when Class II–VI photoconductive films are fired in a vapor atmosphere created by high-temperature heating of selectively doped CdS, CdSe, and the like powders.

Further advantages and objects of the invention will be apparent from reference to the following description taken together with the accompanying drawing, in which.

Figure 1:
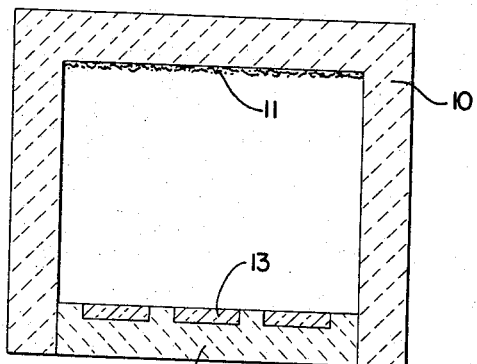
FIG. 1 is a sectional view illustrating the relation of the cover and the substrate holder during the firing operation.

Referring to FIG. 1, there is shown, in cross-section, the relation of parts between the cover 10 and the substrate holder 12 during the activation process when the parts are supported by the floor of an oven, for example.

The cover 10, composed of heat-resistant ceramic, is coated on the inside lid with a sintered thin (one of three mils) layer of "activating powder" 11. The cover 10 is so positioned over the ceramic substrate holder 12 that an enclosed space is formed between the lid and the walls of the cover 10 and the surface of the substrate holder 12.

Pre-coated photoconductor substrates 13 are fitted in shaped recesses in the holder 12. The number and size of the recesses (and substrates) are a matter of choice. During the high-temperature activation step, the enclosed space is filled with vapor emanating from the "activating powder" coating 11 and maintains an atmosphere of such vapor on the surface of the photoconductive film on the substrate 13.

Figure 2:
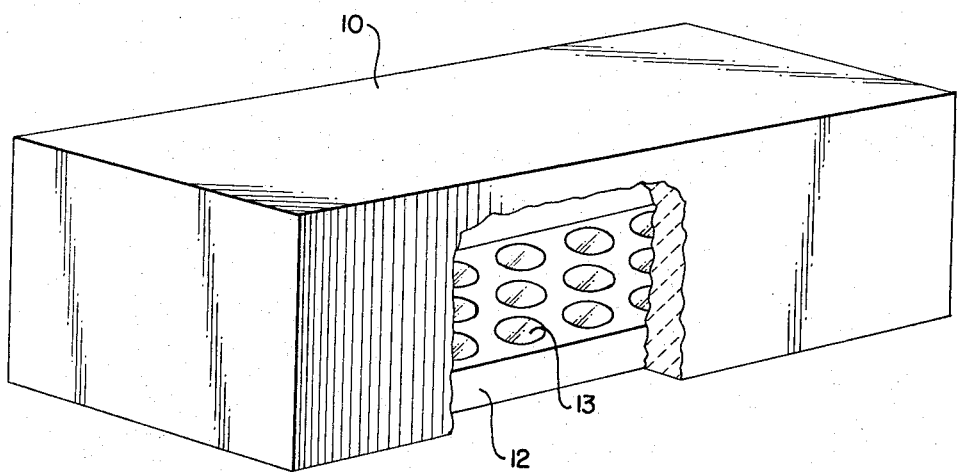
FIG. 2 is a perspective view of the cover and the substrate holder.

Referring to FIG. 2, the perspective view shows the cover 10 positioned so as to cover the substrate holder 12. Rows of photoconductor coated substrates 13 are shown through the cut-out portion of the cover 10.

Example 1

This example describes a specific embodiment of the process of activating a pre-deposited thin CdS photoconductive film, the film having been deposited by the spray process described above. The CdS film was deposited on four-millimeter-diameter glass button substrates by spraying thereon an aqueous solution containing .01 molar $CdCl_2$ and .01 molar thiourea, while the substrates were maintained at 288 degrees centigrade.

The "activating powder" is prepared by thoroughly mixing:

| | | |
|---|---|---|
| Finely-divided CdS powder | grams | 50 |
| $CdCl_2 \cdot 2.5H_2O$ | do | 2.92 |
| $CuCl_2 \cdot 2H_2O$ | do | 0.0666 |
| $H_2O$ | milliliters | 25 |

The resulting paste is then fired in a crucible at 600 degrees centigrade for about thirty minutes. The reaction mass is ground and ball-milled to a fine powder. The powder is then mixed with sufficient xylene to form a thick paste, and the paste is painted on the inside of a Lavite ceramic boat or cover 10 to form a one-to-three-mil-thick coating of "activating powder" 11. The boat is then fired at 300 to 400 degrees centigrade for about fifteen minutes to dry and sinter the powder 11 onto the inside lid of the boat 10.

The final high-temperature heat-treatment, the activation step of the process, is conducted, preferably, by placing the pre-coated circular glass substrates 13 into conforming recesses arranged in parallel rows on a substrate holder 12, preferably a ceramic holder; placing the substrate holder 12 in a high-temperature furnace heated to 582.2 degrees centigrade; covering the substrate holder by placing the cover 10 over the holder, so that "activating powder" 11 is facing and parallel to the surface of the coated glass substrates 13; and heating the assembly for about ten minutes at the stated temperature.

Example 2

This example illustrates the activation process applied to a CdSe film. The process is carried out in the same manner as Example 1 except for the firing temperature of the "activating powder" mixture, which is fired at 550 degrees centigrade for thirty minutes instead of 600 degrees centigrade for thirty minutes, as in Example 1.

Example 3

The process of activating CdSeS is illustrated in this example and is conducted as described in Example 1 except that the "activating powder" mixture is fired at 590 degrees for twenty minutes instead of the temperature and time given in Example 1.

The process variables may, of course, be varied within certain defined limits. For example, the firing temperature for making the "activating powder" may be adjusted from 540 degrees centigrade to 640 degrees centigrade and applied for a time ranging from fifteen to forty-five minutes, preferably thirty minutes.

Generally, the firing temperature which is selected for making an "activating powder" is determined by the composition of the photoconductive film which will be activated with the powder. For example, a CdS film is preferably activated with an "activating powder" mixture which was fired at 600 degrees centigrade for thirty minutes, a CdSe film with one fired at 550 degrees centigrade for thirty minutes, a mixed CdSSe film with one fired at 590 degrees centigrade for twenty minutes, and a ZnCdS film with a powder mixture activated at 600 degrees centigrade for twenty-five minutes.

Class II–VI films may also be activated with "activating powder" in which the CdS has been replaced with an equivalent amount of CdSe.

The proportion of ingredients in the mixture used for preparing "activating powder" is conventional and known in the art.

Generally, the percent, by weight, dopant to host crystal varies from 1% to 10% for $CdCl_2$ and from .02% to .2% for $CuCl_2$.

The following table illustrates typical light resistance values obtained with representative Class II–VI photoconductive films before and after activation by the novel process of the invention.

| Film Type | Light Resistance in Ohms | |
|---|---|---|
| | With Activation | Without Activation |
| CdS | $1 \times 10^4$ to $4 \times 10^4$ | $1 \times 10^5$ to $5 \times 10^5$ |
| CdSe | $5 \times 10^3$ to $1 \times 10^4$ | $5 \times 10^4$ to $1 \times 10^5$ |
| CdSeS | $6 \times 10^3$ to $1 \times 10^4$ | $4 \times 10^4$ to $1 \times 10^5$ |

Resistance values were obtained with a Ne2U bulb operating at two milliamperes. The photosensitive film area measured one millimeter by four millimeters.

The dark resistance for these films was extremely high, ranging from $10^{10}$ to $10^{14}$ ohms. For most uses, it is advantageous that photoconductive films have low light resistance. The table shows that, on the average, film activation reduced light resistance by a factor of "ten."

What is claimed is:

1. An activation process for increasing light-to-dark resistance ratio in Class II–VI photoconductive films, comprising:
   (a) sintering an activating powder on a surface inside of a heat-resistant cover, said activating powder consisting of a major amount of a compound selected from the group consisting of CdS and CdSe and mixtures thereof, containing minor doping amounts of Cd, Cu and Cl; said powder, prior to sintering, having been fired at a temperature ranging from 540 degrees centigrade to 640 degrees centigrade for fifteen to forty-five minutes;
   (b) placing said heat-resistant cover over a Class II–VI photoconductive film, with the activating powder adjacent to and facing the films; and (c) firing the combination in (b) at temperatures between 566 degrees centigrade and 621 degrees centigrade for a time ranging from six to twenty minutes.

2. The activation process of claim 1 wherein the photoconductive film is a thin CdS film.

3. The activation process of claim 1 wherein the photoconductive film is a thin polycrystalline CdS film.

4. The activation process of claim 1 wherein the photoconductive film is a thin CdSe film.

5. The activation process of claim 1 wherein the photoconductive film is a thin CdSSe film.

6. The activation process of claim 1 wherein the photoconductive film is a thin ZnS film.

7. The activation process of claim 1 wherein the photoconductive film is adherently deposited on a heat-resistant glass substrate.

8. An activation process for increasing light-to-dark resistance ratio in photoconductive films, comprising:
  (a) preparing an aqueous activating powder slurry consisting of CdS powder, 1% to 10% $CdCl_2 \cdot 2.5H_2O$ by weight of CdS, and .02% to .2% $CuCl_2 \cdot 2H_2O$ by weight of CdS;
  (b) firing the slurry in (a) at temperatures between 540 degrees centigrade and 640 degrees centigrade from fifteen to forty-five minutes;
  (c) sintering the activating powder produced in (b) on at least one inside surface of a heat-resistant cover at a temperature between 300 degrees centigrade and 400 degrees centigrade for a time between eight and thirty minutes;
  (d) placing said heat-resistant cover over a photoconductive film adherently deposited on a heat-resistant substrate, said film selected from the group consisting of the sulfide and selenide of a material selected from the group consisting of zinc, cadmium, and mixtures thereof, said cover being positioned so that the activating powder is adjacent to and faces said film; and
  (e) firing said film and heat-resistant cover at temperatures between 566 degrees centigrade and 621 degrees centigrade for a time ranging from six to twenty minutes.

9. An activation process for increasing the light-to-dark resistance ratio by materially reducing the light resistance of photoconductive films, comprising:
  (a) sintering an activating powder on a surface inside of a heat-resistant cover, said activating powder consisting of a major amount of CdS containing minor doping amounts of Cu and Cl; said powder, prior to sintering, having been fired at a temperature ranging from 540 degrees centigrade to 640 degrees centigrade for fifteen to forty-five minutes;
  (b) placing said heat-resistant cover over a photoconductive film selected from the group consisting of the sulfide and selenide of a material selected from the group consisting of zinc, cadmium, and mixtures thereof; and
  (c) firing said film and heat-resistant cover at temperatures between 566 degrees centigrade and 621 degrees centigrade for a time ranging from six to twenty minutes.

References Cited

UNITED STATES PATENTS

| | | | |
|---|---|---|---|
| 2,879,182 | 3/1959 | Pakswer et al. | 117—201 |
| 3,065,113 | 11/1962 | Lyons | 117—201 |
| 3,109,753 | 11/1963 | Cole | 117—201 |
| 3,145,120 | 8/1964 | Cheroff et al. | 117—201 |

WILLIAM L. JARVIS, *Primary Examiner.*